(12) United States Patent
Hasskerl et al.

(10) Patent No.: US 8,993,093 B2
(45) Date of Patent: Mar. 31, 2015

(54) COATED SHEET-LIKE PLASTIC MATERIAL WITH REDUCED TENDENCY TO COLONIZATION BY ALGAE, PROCESS FOR THE IN-LINE PRODUCTION THEREOF AND USE

(75) Inventors: Thomas Hasskerl, Kronberg (DE); Wolfgang Scharnke, Griesheim (DE); Martin Berkenkopf, Zwingenberg (DE); Jann Schmidt, Weiterstadt (DE); Xin Lu, Hanau (DE); Uwe Schneider, Gross-Rohrheim (DE)

(73) Assignee: Evonik Röhm GmbH, Darmstadt (DE)

( * ) Notice: Subject to any disclaimer, the term of this patent is extended or adjusted under 35 U.S.C. 154(b) by 0 days.

(21) Appl. No.: 13/635,452

(22) PCT Filed: Mar. 2, 2011

(86) PCT No.: PCT/EP2011/053060
§ 371 (c)(1),
(2), (4) Date: Sep. 17, 2012

(87) PCT Pub. No.: WO2011/113692
PCT Pub. Date: Sep. 22, 2011

(65) Prior Publication Data
US 2013/0008585 A1 Jan. 10, 2013

(30) Foreign Application Priority Data

Mar. 19, 2010 (DE) .......................... 10 2010 003 042
Oct. 5, 2010 (DE) .......................... 10 2010 041 966

(51) Int. Cl.
| | | |
|---|---|---|
| B32B 5/16 | (2006.01) |
| C09D 1/00 | (2006.01) |
| B01J 21/06 | (2006.01) |
| B01J 35/00 | (2006.01) |
| B01J 37/02 | (2006.01) |
| C08J 7/04 | (2006.01) |
| B01J 21/08 | (2006.01) |
| B01J 35/02 | (2006.01) |
| B05D 7/04 | (2006.01) |

(52) U.S. Cl.
CPC ................ C09D 1/00 (2013.01); B01J 21/063 (2013.01); B01J 35/004 (2013.01); B01J 37/0215 (2013.01); C08J 7/045 (2013.01); B01J 21/08 (2013.01); B01J 35/023 (2013.01); B05D 7/04 (2013.01); B05D 2451/00 (2013.01); C02F 2303/20 (2013.01)
USPC ............................ 428/143; 428/328; 428/148

(58) Field of Classification Search
CPC ......... C08J 7/045; B01J 21/063; B01J 35/004
USPC ........................................ 428/143, 328, 148
See application file for complete search history.

(56) References Cited

U.S. PATENT DOCUMENTS

| | | | |
|---|---|---|---|
| 4,576,864 A | 3/1986 | Krautter et al. | |
| 6,228,480 B1 * | 5/2001 | Kimura et al. | 428/328 |
| 2003/0167878 A1 * | 9/2003 | Al-Salim et al. | 75/711 |
| 2009/0217453 A1 | 9/2009 | Theil et al. | |
| 2010/0075142 A1 | 3/2010 | Scharnke et al. | |

FOREIGN PATENT DOCUMENTS

| | | |
|---|---|---|
| EP | 0 149 182 | 7/1985 |
| EP | 0 923 988 | 6/1999 |

OTHER PUBLICATIONS

International Search Report Issued Jul. 6, 2011 in PCT/EP11/053060 Filed Mar. 2, 2011.

* cited by examiner

*Primary Examiner* — William P Watkins, III
(74) *Attorney, Agent, or Firm* — Oblon, McClelland, Maier & Neustadt, L.L.P.

(57) ABSTRACT

A coated sheet-like plastics material comprising a) as base, a thermoplastic substrate; and b) on the base, a photocatalytically active coating comprising a water-spreading layer which involves either a sol-adhesion-promoter layer, layer b1+2), comprising an adhesion promoter and a colloid sol, or a colloid-sol layer b2) arranged on an adhesion-promoter layer b1) applied on the substrate a), and a photocatalytically active layer b3) arranged on the water-spreading layer b1+2) or b2), where b3) is obtainable through application and drying of a mixture comprising, based on the solids content of the mixture in percent by weight b31) from 1 to 25% of titanium dioxide and b32) from 75 to 99% of silicon dioxide and/or of a metal oxide which is not soluble in water or of an anionically modified silicon dioxide or metal oxide; where the titanium dioxide is particulate with an average primary-particle size smaller than 10 nm. In-line process for producing said material, and also use as roofing material or as glazing material, preferably in areas with moist conditions. The coated sheet-like plastics material of the invention combines water-spreading properties with photocatalytic activity, without any damage to the thermoplastic substrates. The coated sheet-like plastics substrate of the invention is produced in a relatively uncomplicated, inexpensive and fast in-line process and, in use, provides impressive substrate stability and impressive effectiveness of the coating in resisting initial algal growth.

9 Claims, No Drawings

COATED SHEET-LIKE PLASTIC MATERIAL WITH REDUCED TENDENCY TO COLONIZATION BY ALGAE, PROCESS FOR THE IN-LINE PRODUCTION THEREOF AND USE

The invention relates to a coated sheet-like plastics material with reduced tendency toward algal colonization, to a process for the in-line production thereof, and also to the use of the coated sheet-like plastics material. In particular, the invention relates to a plastics material with the features of the preamble of claim 1.

Coated sheet-like plastics materials comprising, as base, a thermoplastic substrate, and on the base a coating made of a first adhesion-promoter layer, and also of a second water-spreading layer are known by way of example from EP 0 149 182 A2=document 1 or D1. The coated plastics sheets described in D1 have water-spreading properties. This is the property where water arriving on the surface of the sheets does not accumulate there to give separate droplets but instead the droplets spread and on contact coalesce to give a coherent layer. These materials, known by way of example as Plexiglas No Drop®, are increasingly used as glazing materials for greenhouses, indoor swimming pools, and similar areas with moist conditions. However, because the humidity prevailing in the preferred usage sectors is relatively high, the surfaces are observed to become relatively rapidly unsightly. This can be attributed inter alia to rapid onset of algal growth, often preceded by primary colonization by bacteria. Once the undesired algal growth has begun, it is difficult to stop. It would therefore be desirable to provide water-spreading sheets which have a reduced tendency toward algal growth.

It has been found in practice that once algal growth has occurred on colonized surfaces it is then very difficult to suppress. A more useful approach is to attack the bacterial film which is initially present and which can be said to provide food for the algae. There have been previous disclosures of photocatalytic coatings for plastics materials to which a self-cleaning and/or antimicrobial or growth-inhibiting (algicidal or fungicidal) effect can be attributed.

Document D2=JP2009-119462 A, for example, is available in the form of a machine translation into English, obtainable from the JPO and from INPIT, and describes a photocatalytically coated base where, inter alia, the growth of fungi or algae is suppressed, while a simultaneous intention is to avoid erosion of the base. For this purpose, a photocatalytically active layer comprises from 1 to 20 parts by weight of titanium dioxide particles and from 1 to 70 parts by weight of inorganic oxide particles, for example silica ($SiO_2$). The photocatalytically active layer of D2 also comprises silver or copper, which is converted into silver oxide and copper oxide. The particle size range of the titanium dioxide particles used is from 10 to 60 nm, and the anatase form of titanium dioxide is moreover preferred. Although photocatalytically active layers of this type have high microbicidal action, their relatively high aggressivity to materials including organic plastics materials has proven relatively disadvantageous. In other words, although application of a photocatalytically active layer as in D2 to a base coated as in D1 leads to attack on the initial bacterial film, not least because of the content of silver or copper, and consequently to inhibition of algal growth, there is a risk that the photocatalytically active layer will attack the layers situated thereunder, extending as far as the base plastic, and thus damage them through degradation. Addition of silver or copper is moreover complicated and considerably increases the cost of the sheet. It would therefore be desirable to have a catalytic layer which does not require complicated additions of silver or copper and which nevertheless can control the initial bacterial film in such a way as to reduce the tendency toward algal growth in areas with moist conditions, or as to permit complete avoidance of algal colonization. Silver and copper are moreover biocidal products for the purposes of the EU Directive relating to biocidal products. With a view to sustainability, it is desirable to avoid introducing unnecessary toxic substances into the environment and to achieve the growth-inhibiting effect of a coating by physical methods with longlasting action, instead of applying organic or inorganic biocidal products to kill microbes. Another aim of the present invention is therefore complete avoidance of substances covered by the EU Directive relating to biocides while nevertheless providing a growth-inhibiting effect which is sufficient for practical purposes.

Photocatalytic coatings have likewise been disclosed in D3=WO2003102056 A1. The coatings as in D3 comprise two essential layers. The first layer is composed of a siloxane coating material which optionally comprises silica sol particles. The second exterior layer, which is the actual photocatalytically active layer, essentially comprises photocatalytic titanium dioxide particles. In D3, the coating material for producing the second layer in essence corresponds to the siloxane coating material of the first layer, except that photocatalytic titanium dioxide particles must be introduced.

D3 discloses, as preferred titanium dioxide particles, particles from Showa Denko or Toto, for example NTB 30A. The size of titanium dioxide particles used in D3 is intended to be in the range from 1 to 300 nm, and the proportion of the titanium dioxide particles in the exterior layer in the claims is advantageously in the range from 0.01 to 90% by weight. In Example 1 of D3, a mixture of $TiO_2$ and $SiO_2$ particles (3:1) is applied by flow coating as self-cleaning layer in the form of a colloidal solution. Example 1 of D3 uses by way of example NTB 30B from Showa Denko as siloxane coating material of the exterior layer. This involves a silane-hydrolysis product. Although assessment of coating-material flow and of curing is "good" it is noticeable that complete hardening of the siloxane coating material and achievement of sufficient mechanical strength of the layer require about three hours of drying time at about 80° C. This long curing time is prohibitive for in-line coating of sheet-like plastics substrates, for example sheets. Alongside this energy-intensive and time-consuming curing process, an activation process is moreover necessary for the incipient etching of the siloxane coating material, and in an in-line process this is likewise impossible or possible only with difficulty. It would therefore be desirable to have a fast-drying coating which has a curing time in the range of seconds or a few minutes, rather than hours. Adhesion between the photocatalytically active layer and the layer situated thereunder should moreover be sufficiently great to avoid any additional activation step, for example through etching. The desired success is therefore not achieved simply by transferring and using the two-layer coating known from D3 on the coated sheet of D1.

In view of the prior art mentioned and discussed in the introduction, the invention was therefore based on the object of providing a sheet-like plastics material which has a water-spreading property, preferably having the property known from document 1, while at the same time having reduced tendency toward algal growth.

This coating is intended to have good action, i.e. both the water-spreading property and the property of inhibiting growth are intended to combine to give a high quality level. The coating here is intended to be long-lasting and stable. The coating is also intended to be permanently hydrophilic, specifically without any requirement for an activation step for this purpose for example involving irradiation with UV light in a moist environment as is the case with conventional titanium dioxide coatings. Customary titanium dioxide coatings lose their hydrophilic properties in dry and dark conditions and regain their hydrophilic properties only on exposure to moisture and in the presence of light with sufficient UV content.

The coating is moreover intended to provide sufficient abrasion resistance, and also good capability for lamination.

The coating is moreover intended to exhibit sufficient weathering resistance.

Finally, the coating is intended to be "substrate-friendly", where this means that although the coating is intended to be effective in reducing algal growth on the one hand it is nevertheless on the other hand intended not to exhibit aggressivity to the extent that the organic material is damaged, for example the plastics substrate to which the coating has been applied. It has been found hitherto, in particular in the case of effective coatings, that noticeable substrate damage occurred even after short exposure times. Coatings of that type are therefore used only on inorganic substrates, or complicated intermediate layers are required to protect the substrate.

The water-spreading coating which inhibits growth is intended to be capable of application in an in-line process. In particular, the intention is to permit low-cost coating, i.e. fast, transparent in-line coating, using simple apparatus, of sheet-like plastics material within an extrusion plant for the production of the plastics material through extrusion, directly following the extrusion process, onto the plastics materials while they retain some heat from the extrusion process.

To this end, the coating is intended to be capable of fast and complete hardening after the application process, and specifically at moderate curing and drying temperatures below 100° C.

A further intention is that the coating itself, and also the coating process, have maximum sustainability, and the intention is therefore to avoid the use of substances covered by the EU Directive relating to biocidal products, an example being copper or silver, and also that the coating process have maximum ease of implementation, while substantially avoiding substances hazardous to the environment, for example solvents.

A coated sheet-like plastics material with all of the features of claim 1 achieves these objects, and also achieves other objects which are not explicitly mentioned but are readily derivable from the discussion of the prior art in the introduction. The objects underlying the invention in respect of the process, and also the use, are achieved through the subject matter of the independent claim of the respectively appropriate category. Advantageous embodiments and forms of the invention are protected in the respective dependent claims.

By using a coated sheet-like plastics material with reduced tendency toward algal colonization comprising a) as base, a thermoplastic substrate; and
b) on the base, a photocatalytically active coating comprising
   a water-spreading layer which involves
      either a sol-adhesion-promoter layer b1+2),
      comprising an adhesion promoter and a colloid sol,
         or a colloid-sol layer b2) arranged on an adhesion-promoter layer b1) applied on the substrate a),
and
   a photocatalytically active layer b3) arranged on the water-spreading layer b1+2) or b2), where b3) is obtainable through application and drying of a mixture comprising, based on the solids content of the mixture in percent by weight
   b31) from 1 to 25% of titanium dioxide and
   b32) from 75 to 99% of silicon dioxide and/or of a metal oxide which is not soluble in water or of an anionically modified silicon dioxide or metal oxide;
where the titanium dioxide is particulate with an average primary-particle size smaller than 10 nm, and preferably with at most 50% by weight content of the rutile form;

it is possible to provide, in a manner not readily foreseeable by the person skilled in the art, a coated sheet-like plastics material which combines permanent water-spreading properties with photocatalytic action, without any damage to the thermoplastic substrates. The sheet-like plastics substrate coated in the invention is produced in a relatively uncomplicated, low-cost, fast in-line process, and, when used, exhibits impressive stability of the substrate and impressive action of the coating in inhibiting initial algal colonization.

The invention also achieves a large number of further advantages. Among these are inter alia the following:

The coating of the invention, comprising at least three sublayers or layers, is photocatalytically active with respect to a bacterial film which is a precondition for algal growth, and thus inhibits initial algal growth.

Despite sufficiency of photocatalytic effectiveness in inhibiting or suppressing initial algal growth, there is no damage to the substrate, which takes the form of a thermoplastically processable plastic.

The photocatalytically active layer is applied from a purely aqueous system and is therefore not hazardous to the environment.

The photocatalytic layer comprises no constituents which have biocidal action and which are covered by the EU Directive relating to biocidal products, an example being silver, copper or organic biocides, which lose their effectiveness and over the course of time are discharged into the environment. The layer acts in a sustainable manner, in particular without releasing biocides into the environment.

The photocatalytically active coating is stable over a particularly long period, because the system to be applied is free from solvent, and also because of the absence of organic binders.

The coating has only very low thickness, and the thickness of all three layers together is advantageously no more than about 2 μm, with resultant conservation of natural resources, and therefore comparatively little pollution of the environment.

The photocatalytically active layer involves a transparent, clear coating which remains clear and transparent irrespective of whether it is wet or dry.

Although the titanium dioxide particles, which have relatively small average diameter in the range smaller than 10 nm, per se have a tendency toward "chalking" in the photocatalytically active layer, this being the tendency to have inadequate adhesion between particle and the surrounding matrix, with resultant separation from the surroundings in the event of friction or abrasion of the surface or through natural erosion due to environmental effects, such as UV light, rain, and wind, the particular selection of the quantitative ratios between titanium dioxide particles and silicon dioxide particles in the invention provides a durable coating which is free from chalking and which is mechanically stable, and from which the titanium dioxide particles do not separate under usual conditions.

The photocatalytic layer has comparatively high mechanical strength, although the silica-sol matrix of the photocatalytic layer is porous, and it therefore has a relatively large active surface when compared with a smooth layer.

The coating requires no particular conditioning in order to be active and permanently hydrophilic, i.e. the angle of contact of a water droplet applied to the layer is always, even after dark phases or dryness, smaller than 15°, preferably smaller than 7°.

Each of the individual layers, i.e. not only the adhesion-promoter layer but also the water-spreading layer, and also the photocatalytically active layer, preferably has high transparency.

The entire coating therefore also preferably has very high transparency, and a transparent plastics substrate equipped therewith can therefore be used with particular advantage as glazing material.

The invention in particular combines properties which were hitherto not known in combination. In particular, the invention consists in the combination of a low-cost, transparent, in-line coating with low haze from an extrusion plant with good effectiveness, long life, permanent hydrophilic properties without activation, short curing and drying times of a few minutes, moderate curing and drying temperatures markedly below 100° C., abrasion resistance, lamination capability, weathering resistance, reduced algal growth, and protection of substrate from photocatalytic attack.

The invention provides coated sheet-like plastics materials which have, as base, a thermoplastic substrate. Thermoplastic substrates suitable for the purposes of the present invention are known per se. The term "thermoplastic" in this context refers to plastics which can be reversibly deformed within a certain temperature range. This means that the deformation can be repeated as often as desired, as long as overheating does not cause thermal decomposition of the plastic. For the purposes of the invention, substrates of this type comprise in particular polycarbonates, polystyrenes, polyesters, such as polyethylene terephthalate (PET) and polybutylene terephthalate (PBT), cycloolefinic polymers and copolymers (known as COCs), and/or poly(meth)acrylates.

The expression "poly(meth)acrylates" here and in the entire disclosure comprises polymethacrylates and polyacrylates.

Among the thermoplastically processable plastics materials mentioned, preference is given to polycarbonates, cycloolefinic polymers and copolymers, and also poly(meth)acrylates. Very particular preference is given to polymethacrylates, such as polymethyl methacrylate (PMMA).

The plastics substrates that can be used for the invention can be produced by way of example from molding compositions of the abovementioned polymers. The processes here generally use thermoplastic shaping processes, such as extrusion or injection molding, particularly preferably extrusion. The weight-average molar mass $M_w$ of the homo- and/or copolymers to be used in the invention as molding composition for the production of the plastics substrates can vary widely, and the molar mass here is usually matched to the intended use and the method of processing of the molding composition. However, it is generally in the range from 20 000 to 1 000 000 g/mol, preferably from 50 000 to 500 000 g/mol, and particularly preferably from 80 000 to 300 000 g/mol, with no intended resultant restriction.

The plastics substrates can moreover be produced through casting processes, for example by the known cell process. In this process, by way of example, suitable (meth)acrylic monomers and/or prepolymers are charged to a mold and polymerized. (Meth)acrylic mixtures of this type generally comprise the (meth)acrylates mentioned, in particular methyl methacrylate. The (meth)acrylic mixtures can moreover comprise the copolymers described above and also, in particular for viscosity adjustment, polymers, in particular poly(meth)acrylates.

Among the thermoplastic substrates obtainable through injection molding, extrusion, or casting processes (cell processes, Rostero processes), those of particular interest for the invention are obtainable by extrusion processes. This is related to the aim of providing an in-line process, an aim which is more advantageously realizable by means of continuous extrusion processes than by using batch casting processes.

The molding compositions to be used for the production of the plastics substrates can moreover comprise the usual additives of any type, as well as the acrylic resins. Among these are inter alia antistatic agents, antioxidants, mold-release agents, flame retardants, lubricants, dyes, flow improvers, fillers, light stabilizers and organophosphorus compounds, such as phosphites, phosphorinanes, phospholanes, or phosphonates, pigments, weathering stabilizers, and plasticizers. However, the amount of additives has to be matched to the intended use.

Particularly preferred molding compositions which comprise poly(meth)acrylates are available commercially with trademark PLEXIGLAS® from Evonik Röhm GmbH. Preferred molding compositions, where these comprise cycloolefinic polymers, can be purchased with trademark Topas® from Ticona and Zeonex® from Nippon Zeon. Polycarbonate molding compositions are obtainable by way of example with trademark Makrolon® from Bayer Material Science or Lexan® from Sabic.

The plastics substrate particularly preferably comprises at least 80% by weight, in particular at least 90% by weight, based on the total weight of the substrate, of poly(meth)acrylates, polycarbonates, and/or cycloolefinic polymers. The plastics substrates are particularly preferably composed of polymethyl methacrylate, where the polymethyl methacrylate (PMMA) can comprise the usual additives.

The exterior form or shape of the plastics materials which are coated in the invention can differ greatly. The only precondition is that they involve a material used when the accumulation of separate water droplets on its surface is undesired, the formation of a coherent water layer is desired, and the suppression of initial algal growth is likewise desired. This applies in very particularly excellent manner to material for glazing and covering purposes for areas with moist conditions, for example greenhouses, bathrooms, saunas, or glazing materials for buildings in tropical latitudes with predominantly high humidity.

Preferred materials are sheet-like materials, such as films and panels or sheets. Among the films are sheet-like structures of thickness below 1 mm extending to about 0.01 mm, and preferably of thickness from 0.05 to 0.5 mm. Among the panels or sheets are rigid sheet-like structures of thickness starting at 1 mm up to about 50 mm, and preferably of thickness from 2 to 20 mm, particularly preferably of thickness from 2 to 10 mm. Particular preference is given to panels which have cavities and which are extruded in the form of a one-piece system, twin-web sandwich panels, and also the structures known as multiple-web sandwich panels, the total thickness of which is generally from 5 to 50 mm. The thickness of the external walls of these is mostly from ¹/₂₀ to ⅛ of the total thickness, and there are perpendicular or oblique fillets connecting these walls to one another to give a one-piece system.

The surfaces of the plastics material to be coated are generally flat and smooth and mostly relatively glossy. The plastics material can be transparent, translucent, or light-permeable; it is preferably clear and colorless or white and translucent.

The invention has particularly good suitability for all of the plastics of which the surfaces are intrinsically water-repellent. These are especially plastics of which the actual structure comprises no, or negligibly few, polar groups. Among these are by way of example polyethylene, polypropylene, polystyrene and impact-modified polystyrene derivatives, polyvinyl chloride, and polyester. They are termed water-repellent if the angle of contact of a water droplet thereon is more than 70°. Preferred plastics here are in turn poly(meth) acrylates (acrylic sheet) and polycarbonates, in particular of bisphenol A; these materials are used as rigid plastics glazing materials for greenhouses and indoor swimming pools, and specifically preferably in the form of extruded panels having cavities.

The thermoplastic substrate a) functioning as base has a photocatalytically active coating b). The coating b) in its entirety combines water-spreading properties with secondary action against microorganisms resulting from photocatalysis.

In the invention, the coating b) in turn comprises at least one water-spreading layer b1+2) or b2) and a photocatalytically active layer b3) arranged thereon.

In a first preferred embodiment, the coating b) has three different layers or sublayers, which are applied in the sequence b1), b2), and b3) over one another and in chronological succession to at least one portion of the surface of the substrate a).

In a second preferred embodiment, the coating b) has two different layers or sublayers, which are applied in the sequence b1+2) and b3) over one another and in chronological succession to at least one portion of the surface of the substrate a).

In the first preferred embodiment, there is an adhesion-promoter layer b1) arranged as first layer or sublayer on the substrate a). The location of this adhesion-promoting layer b1) is accordingly between the water-spreading layer b2) and the water-repellent plastics surface of the substrate a). If a water-spreading coating which is photocatalytic has been provided only to a portion of the base, it is sufficient that the adhesion-promoting layer is also applied only to the corresponding portions.

The essential property of the adhesion-promoting layer is that it has greater adhesion both to the plastics surface and to the water-spreading layer than the latter has to the plastics surface. While there are numerous organic polymer substances which adhere well to a water-repellent plastics surface, particular properties are required for adequate adhesion to the water-spreading layer. They are based on the polar groups in the adhesion-promoting layer in combination with its insolubility and lack of swellability in water. The polar groups must not necessarily be groups bonded chemically to the main constituent of the adhesion-promoting layer, although this is preferred; instead, it is sufficient that they are groups chemically bonded to an ancillary constituent. It is assumed that the adhesion is a result of interaction between the oxygen atoms or hydroxy groups of the oxides and the polar groups. Since water molecules are likewise capable of strong interaction with the oxide oxygen atoms and can displace the polar groups, the polymer material of the adhesion-promoting layer is intended to have minimum water absorption. Furthermore, the adhesion would also be impaired by morphological alterations resulting from frequent swelling and reversal of swelling. This explains the significance of low swellability combined with limited polarity, although there is no intention of any resultant attachment of the invention to any particular theory.

The organic material of the adhesion-promoting layer is composed of at least one macromolecular substance with a weight-average molecular weight Mw greater than 1000, preferably above 10 000. This can involve a purely organic material with a continuous carbon skeleton or a carbon skeleton interrupted by oxygen atoms or by nitrogen atoms, or a mixed organic-inorganic material of which the continuous underlying skeleton is composed entirely or to some extent of heteroatoms, such as oxygen and silicon.

Particular polar groups that may be mentioned are hydroxy, carboxy, sulfonyl, carboxamide, nitrile groups and silanol groups. They are preferably a constituent of a macromolecular compound which simultaneously comprises nonpolar groups, such as alkyl, alkylene, aryl, or arylene groups. The ratio of polar to nonpolar groups is advantageously to be selected in such a way as to achieve adhesion not only to the water-repellent—i.e. nonpolar—plastics surface but also to the water-spreading, i.e. hydrophilic, layer. The polarity here is intended not to be so great that the material of the adhesion-promoting layer would itself be water-soluble or swellable in water. Swelling on saturation with water at 20° is not above 10% by volume and preferably not above 2% by volume. However, the polarity is also intended not to be so low that the material would be soluble in entirely nonpolar solvents, such as gasoline. Most of the suitable materials are soluble in organic solvents of relatively low polarity, such as esters, ketones, alcohols, ethers, or chlorinated hydrocarbons, or mixtures of these with aromatics.

The material of the adhesion-promoting layer does not generally itself have water-spreading properties. Water droplets on its surface mostly form angles of contact above 20°, in particular from 20° to 70°.

The required balance of affinities to the two adjacent layers is generally achieved if the material of the adhesion-promoting layer comprises from 0.4 to 700 milliequivalents of polar groups for every 100 g of the polymer material.

It is also advantageous if the polymer material has three-dimensional crosslinking, but if the adhesion-promoting layer is produced from a solution of the polymer material this crosslinking may be brought about only after formation of the layer. Crosslinking can sometimes reduce swellability. However, the crosslinking is not intended to be so strong that the polymer material is entirely hard and brittle. A certain elastic extensibility of the—optionally crosslinked—polymer material is advantageous.

A suitable class of polymer materials is composed of polymers and, respectively, copolymers of vinyl monomers. It is advantageous that at least a portion of the vinyl monomer units has a polar group of the type mentioned. It can derive from the underlying monomers, or can have been introduced into the polymer though subsequent reaction. A portion of the vinyl monomers can preferably comprise nonpolar groups, such as alkyl, alkylene, aryl, or arylene groups.

The polar groups differ in their polarizing action. This increases in the sequence nitrile, hydroxy, prim. carboxamide, carboxy, sulfonyl, silanol. The stronger the polarizing action, the lower the required content in the polymer material. Whereas the amount used of the weakly polar groups is from 4 to 100 milliequivalents of polar groups for every 100 g of polymer material, it is sufficient to use from 0.4 to 20 milliequivalents/100 g of the strongly polar groups. If the selected content of polar groups is too low, adequate adhesion of the water-spreading layer is not achieved. If, in contrast, the content of polar groups is too high, water-swellability rises excessively, and this in turn reduces adhesion.

Among the vinyl monomers which bear the groups mentioned are by way of example acrylo- and methacrylonitrile, hydroxyalkyl esters of unsaturated polymerizable carboxylic acids, in particular those having from 2 to 6 carbon atoms in the hydroxyalkyl moiety, glycidyl acrylate and glycidyl methacrylate, or the dihydroxyalkyl esters produced therefrom by hydrolysis, the amides of the acids mentioned, especially acrylamide and methacrylamide, acrylic, methacrylic, maleic, fumaric, or itaconic acid, and also vinylsulfonic acid, styrenesulfonic acid, acryl- and methacrylamidoalkanesulfonic acids, acryloxy- and methacryloxyalkanesulfonic acids, acryloxy- and methacryloxyalkyltrialkoxysilanes, and hydrolysis products of these. Preference is given to polar groups which are not basic and are not of salt type, particular preference being given to hydroxy, carboxy, carboxamido, and silanol groups.

Vinyl monomers which may be mentioned and which have nonpolar groups are the alkyl esters of unsaturated, polymerizable acids, e.g. acrylic, methacrylic, maleic, fumaric, or itaconic acid. The alkyl moieties generally comprise from 1 to 18 carbon atoms, preferably from 1 to 8 carbon atoms. Among these monomers are also styrene, vinyltoluene, vinyl acetate, vinyl propionate, and other vinyl esters of fatty acids, vinyl chloride, and vinylidene chloride.

Copolymers of polar and nonpolar vinyl monomers can be produced by known processes of free-radical polymerization, e.g. by solution polymerization or emulsion polymerization. The resultant solutions or dispersions can, optionally after dilution, be used immediately for the production of the adhesion-promoting layer.

Other classes of suitable polymer materials for the adhesion-promoting layer are epoxy resins, polyurethanes, polycarbonates, polyethers, or polyesters modified by polar groups. The polar groups can be a constituent of the starting materials used, or can have been introduced subsequently into the polymer material. Polymer materials having hydroxy groups can be reacted by way of example with silanes which bear at least two silicon-bonded halogen atoms, alkoxy groups, or aryloxy groups. Examples that may be mentioned are tetrachlorosilane, tetraethoxysilane, tetraphenoxysilane, methyltrimethoxysilane, and methyltrichlorosilane. Hydrolysis of the groups thus introduced, optionally only after formation of the adhesion-promoting layer, produces polar silanol groups. An advantage of these over the other polar groups is that they exert very strong bonding in relation to silicon oxide and aluminum oxide, but have very little effect on the water-swellability of the adhesion-promoting layer. Polymer materials having Si—OH groups as adhesion-promoting layer therefore form a preferred embodiment of the invention.

The adhesion-promoting action is exerted at the two boundaries, in relation to the water-repellent plastics layer on the one hand and, on the other hand, in relation to the water-spreading layer. Even a layer of low thickness is sufficient for this purpose. The thickness of the layer is therefore generally only from 0.01 to 20 µm and preferably from 0.01 to 2 µm. Thicknesses smaller than 0.01 µm are difficult to produce without defects. Thicknesses greater than 20 µm are less cost-effective, but are entirely effective technically. Layers with minimum thickness are preferred for environmental reasons, for example in the range from 0.01 to 1 µm. Layer thicknesses from 0.02 to 0.9 µm for the adhesion-promoter layer are even more advantageous.

A particularly effective adhesion-promoter layer can be achieved in the invention by using a solvent-containing primer, e.g. a 2.5 percent solution of a copolymer of 47% by weight of butyl methacrylate, 47% by weight of methyl methacrylate, 3% by weight of an alkylated N-methylolmethacrylamide, and 3% by weight of hydroxyethyl acrylate in a mixture of isopropyl alcohol and toluene.

Preference is moreover also given to adhesion-promoting layers which are obtainable through application from a solution or from a polymer dispersion which comprises a copolymer of, for example, 47% by weight of butyl methacrylate, 47% by weight of methyl methacrylate, 3% by weight of glycidyl methacrylate, and, for example, 3% by weight of methacrylic acid.

Preference is moreover also given to adhesion-promoting layers which are obtainable through application from a solution and hydrolysis, where the solution comprises a copolymer of, for example, 87% by weight of methyl methacrylate and, for example, 13% by weight of gamma-methacryloxypropyltrimethoxysilane.

Still more preference is also given to adhesion-promoting layers which are obtainable through application from a solution and hydrolysis, where the solution comprises a copolymer of, for example, 85.6% by weight of methyl methacrylate, for example 12.4% by weight of gamma-methacryloxypropyltrimethoxysilane, and 2% by weight of N-butoxymethylmethacrylamide.

The adhesion-promoting layer b1) is followed by a water-spreading layer b2). For the purposes of the invention, water-spreading layers used comprise variously hydrated and neutralized forms of oxides, such as silicon dioxide and aluminum oxide, or of oxide mixtures or of mixed oxides. Surprisingly, it has been found for the purposes of the invention that, unlike in the prior art, which often uses the pure oxides, oxide mixtures or mixed oxides in a form which has not been (partially) neutralized or (partially) hydrated, markedly improved adhesion performance is obtained by using hydrated, partially hydrated, neutralized, and partially neutralized forms. In contrast, pure oxides, where the aim is purely the absence of neutralization and hydration, do not bond sufficiently to the primer and to the other particles. That type of layer therefore lacks adhesion and can be wiped away as if it were dust. Examples of other materials of particular interest for the invention are silicon-aluminum mixed oxides with an Si/Al ratio of from 1:1 to 30:1. They are to some extent neutralized with bases, and then comprise cations, such as alkali metal ions or ammonium ions. The latter readily volatilize on drying.

Other metal oxides which can be present alongside or instead of silicon oxide or aluminum oxide in the water-spreading layer derive by way of example from the element zinc, titanium, zirconium, or chromium. Preference is given to colorless metal oxides. A precondition is always that the oxides are practically insoluble in water. The solubility of oxides per se or of their hydrated forms in water at 20° C. is intended to be below 200 ppm.

The oxide layer has a powerful water-spreading effect. This action is attributable not only to the good water-wettability of the oxides but also to the submicroscopic roughness of the oxide layer.

The metal oxides can be applied in a form which is already colloidal, in particular in water as suspension medium, but it is also possible to use colloids in polar liquids, such as dimethylformamide or isopropanol, or in aqueous solvents, such as mixtures of acetone, methanol, or ethanol with water. The size of the colloid particles is below 200 nm, preferably below 120 nm, in particular from 5 to 100 nm. In all instances they do not comprise the pure oxides but instead, as already described above, comprise variously hydrated and neutralized forms.

Colloidal silica is available commercially in various preparations that can be used. Particularly suitable types are anionic, comprising cations for stabilization, e.g. alkali metal ions or ammonium ions.

It is essential to the invention that the water-spreading layer b2) is composed—ignoring any possible surfactant content—mainly, i.e. to an extent of more than 90% by weight, preferably to an extent of more than 97% by weight, of silicon dioxide and/or of the metal oxide. Other constituents which are not water-soluble are preferably avoided completely. Water-spreading properties must always be present, corresponding to an angle of contact of a water droplet equal to or below 15°, preferably equal to or below 7°.

A particularly advantageous embodiment of the invention is characterized in that the water-spreading layer consists essentially of silicon dioxide. Particularly advantageous materials are sodium-containing silica sols as stated with a molar ratio $SiO_2$:NaOH of 100:2.

The water-spreading layer is obtainable through application and drying of a colloid sol. Among particularly preferred colloid sols are silica sols. These comprise no, or only very small amounts of, organic contaminants or byproducts, and in this respect differ from siloxane coating materials or products obtained from silane hydrolysis, and this has a particularly advantageous effect on curing times.

The silica sols particularly advantageously involve monodisperse silicon dioxide particles. These monodisperse $SiO_2$ particles can be obtained by way of example through treatment of an aqueous alkali metal silicate solution (waterglass) with ion exchangers and stabilization by a little alkali. The molar ratio $SiO_2$:NaOH here is advantageously about 100:2.

In comparison with the products of silane hydrolysis, the silica sols preferred for the water-spreading layer in the invention feature a drying process with fast aggregation, and also fast crosslinking.

For the purposes of the invention, the monodisperse silicon dioxide particles themselves advantageously have a particular size. The average diameter of the particles is fundamentally in the range from 5 to 80 nm. Preference is given to an average particle diameter in the range from 7 to 50 nm. The average size of the primary particles is particularly preferably in the range from 10 to 30 nm. If the average particle diameter is below 5 nm, the sols can then be handled only in low concentrations and have low shelf life. If the average particle diameter is above 80 nm, cloudy layers can be obtained and adhesion to the substrate decreases.

In a particular embodiment of the invention, mixtures of monodisperse silica sols with different particle sizes can be used.

When average particle diameter is mentioned in this context, it means the size determined in the following way. The specific surface area is determined and the particle size is calculated therefrom on the assumption that uniform spherical particles are involved.

The specific surface area is determined as BET value after drying of the silica sols to give the solid, amorphous silica under defined conditions, using the nitrogen adsorption method (S. Brunauer, P. H. Emmet and E. Teller: J. Amer, Chem. Soc. 60, 309-312 [1938]). After calibration to these BET values, it is also possible to titrate directly from aqueous solution with sodium hydroxide solution (G. W. Sears: Anal. Chem. 12, 1981-1983 [1956]).

Another feature of the water-spreading layer is its thickness. It has been determined that the tendency of the layer toward delamination increases markedly with thickness. Since it is only the coherent surface, and not the thickness, of the layer that is important for its effectiveness, the best possible action is obtained from the thinnest possible layer that can be produced from the colloid used. Preference is therefore given to a layer thickness of from 0.05 to 2 μm, in particular from 0.05 to less than or equal to 1 μm, and particularly advantageously from 0.1 to less than or equal to 1 μm. Layers even thinner than 0.05 μm do not always provide sufficient protective action with respect to photocatalytic attack from the subsequent photocatalytically active layer. Layers thicker than 2 μm can have a tendency to become brittle, and to have low adhesion and to appear cloudy.

However, a particularly effective product and process features combination, within one layer, of the adhesion-promoting and water-spreading components. It is thus possible to save a step in the process.

In the second preferred embodiment of the present invention, a water-spreading and adhesion-promoting layer b1+2) is therefore applied in a single pass to the substrate.

This layer comprises an adhesion promoter and a colloid sol. The colloid sol for the production of the layer b1+2) corresponds here to the colloid sol described in the $1^{st}$ preferred embodiment.

However, a factor which must be considered in relation to the adhesion promoter is that in this embodiment the adhesion-promoter layer is not produced prior to application of the water-spreading layer, but instead, in this instance, an adhesion-promoter/colloid-sol-containing layer is applied and hardened. In the second preferred embodiment of the present invention, it is therefore preferable to use thermally and/or UV-curable adhesion promoters. It is likewise preferable to use sol-adhesion-promoter mixtures for the production of the layer b1+2), where these can be hardened in a plurality of steps through different types of initiation, e.g. on the one hand thermally and on the other hand through UV radiation.

Preferred adhesion promoters used for the production of the layer b1+2) are water-thinnable hydroxy-functional and/or carboxy-functional polyesters, alkyd resins, acrylic resins, and polymer dispersions, also termed emulsion polymers. Film formation generally first takes place thermally through evaporation of the water and optionally of the cosolvent. In the second step, a crosslinking reaction mostly takes place. In the case of the water-thinnable polyesters and alkyd resins, the crosslinking process can take place through addition of water-thinnable melamine resins or polyisocyanates. Crosslinking of the films gives them a higher level of mechanical and chemical resistance.

Particular preference is given to radiation-curable polymer dispersions based on polymers produced from aliphatic polyurethane acrylates. The advantages of this class of substance are especially good to very good weathering resistance and variably adjustable hardness and, respectively, flexibility. The properties of the coating can therefore be readily adapted to the requirements of the application through targeted selection of raw materials.

The production process generally takes place through reaction of isocyanate-functional prepolymers with hydroxy-functional acrylic esters.

The size of the polyurethane particles is generally about 30 nm to 1000 nm, and they therefore bring about a milky white appearance. The smaller the particles, the more transparent the appearance of the dispersion. The solids content in commercially available polyurethane dispersions is typically from 30 to 50% by weight. Among the largest suppliers of radiation-curable polyurethane dispersions are the following producers: BASF (D), Bayer MaterialScience (D), Cytec (USA), Dai Nippon Ink (Japan), Dow Chemical (USA), and DSM (NL).

In the first step, the water, and optionally cosolvent, evaporate(s). The second curing step initiated through UV radiation gives the coating its final properties. The films can be dried at room temperature or else at elevated temperatures, if the substrate permits this.

The thickness of the sol-adhesion-promoter layer b1+2) is from 1 μm to 50 μm, preferably from 2 μm to 30 μm, and particularly preferably from 3 μm to 20 μm. Excessive layer thicknesses require longer drying time and mostly also require higher drying temperature. Excessively thin layers can easily be damaged by mechanical stress and can thus lose their adhesion-promoting effect.

The water-spreading layer b2) or b1+2) is followed by a photocatalytically active layer b3). This is attainable through application and drying of a mixture comprising, based on the solids content of the mixture in percent by weight, b31) from 1 to 25% of titanium dioxide and b32) from 75 to 99% of silicon dioxide and/or of a metal oxide that is not water-soluble, or of an anionically modified silicon dioxide or metal oxide; where the titanium dioxide is particulate with an average primary-particle size smaller than 10 nm and preferably at most 50% by weight content of the rutile form.

The photocatalytically active layer b3) comprises, as constituents, in selected quantitative ratios, b31) titanium dioxide particles and b32) materials which also constitute the water-spreading layer b1+2) or b2). This involves a particularly advantageous embodiment of the invention, because the use of a matrix identical with the water-spreading layer b1+2) or b2) is firstly logistically simple and is secondly useful insofar as the resultant adhesion between b1+2) or b2) and b32) is excellent, and there is no need to use any further primer, adhesion promoter, or the like.

The proportions of titanium dioxide particles and matrix particles within the actual photocatalytically active layer b3) have proven to be critical. If the proportion of titanium dioxide particles b31) is below 1% by weight, there is a risk that the growth-inhibiting action of the photocatalytic coating b) will be insufficient for effective inhibition of initial algal growth. If the proportion of titanium dioxide particles b31) is more than 25% by weight, the silicon dioxide particles b32) preferably functioning as matrix can lose capability to include the titanium dioxide particles b31) sufficiently durably and securely to provide reliable suppression of "chalking" of the titanium dioxide particles. It is preferable that the proportion of titanium dioxide particles b31) is in the range from 2 to 15% by weight. Still more preferably, the proportion of these is from 3 to 10% by weight. Contents of from 4 to 8% by weight are particularly advantageous. An ideal balance between effectiveness or activity on the one hand and matrix binding on the other hand is obtained with proportions in the range from 5 to 7.5% by weight of titanium dioxide particles b31).

The amounts of matrix particles b32) are complementary to the proportions mentioned. The proportion of the matrix particles b32) is preferably in the range from 85 to 98% by weight. The proportion of these is still more preferably from 90 to 97% by weight. Contents from 92 to 96% by weight are particularly advantageous. An ideal balance between effectiveness or activity on the one hand and matrix binding on the other hand is obtained with proportions in the range from 92.5 to 95% by weight of matrix particles b31).

Specific ratios of titanium dioxide particles b31) to matrix particles b32) have also proven to be particularly advantageous here. Quantitative ratios of from 1:99 to 1:3 are possible in the invention. However, preference is given to quantitative ratios in the range from 1:16 to 1:6. Quantitative ratios in the range of about 1:12 to 1:7 are ideal.

It is essential that the titanium dioxide particles present in the photocatalytically active layer b3) have particular properties, in order to be useful for the invention. It is therefore important that the average primary-particle size of the titanium dioxide particles is smaller than 10 nm.

The average primary-particle size of the titanium dioxide is determined as follows: titanium dioxide particles are scanned by an electron microscope (EM). The average primary-particle size is calculated as numeric average from 100 measurements. The length measured in each case is that of 100 different randomly selected primary particles. The primary particles usually take the form of spheres. However, non-spherical particles can also be used with success. In the case of these non-spherical particles, for example aspherical or, for example, elliptical particles, the average particle diameter is determined by measuring in each case the longest axis and the shortest axis, adding the results, and dividing by two.

Extensive experimental studies have now shown that titanium dioxide particles having an average primary-particle size of 10 nm or greater cannot be used, or can be used only with difficulty, as photocatalytically active constituents in the layer b3). In particular, particles with an average diameter of 10 nm or greater tend to have activity which is either completely uncontrollable or is not sufficiently controllable, and this leads in the long term to damage to the organic plastics substrate. Although larger titanium dioxide particles generally have excellent growth-inhibiting action, complicated measures have to be adopted for the protection of the substrates, and the aim of applying an effective but simple coating by a simple process cannot be realized.

Titanium dioxide particles that can be used with particular success have an average primary-particle size in the range from 1 nm to smaller than 10 nm. Below an average particle diameter of 1 nm, ease of handling can be subject to restriction, and/or the growth-inhibiting activity of the particles is not sufficient to provide sufficiently effective attack in the initial phase of algal growth. Titanium dioxide particles with an average primary-particle size in the range from greater than 2 nm to 10 nm are of particular interest for the invention. Still further preference is given to average primary-particle sizes in the range from 4 to 9 nm.

Another factor which plays a not insignificant part in the invention, alongside the average particle diameter, is the spatial configuration of the titanium dioxide particles. Titanium dioxide occurs in various forms as a function of the linkage of the octahedra. The form known as anatase is known to be photocatalytically active. The form known as rutile is known to be in essence photocatalytically inactive. Surprisingly, it has now been found for the purposes of the invention that it is also possible to use titanium dioxides with a crystal structure composed of rutile form and anatase form and, respectively, of other crystal forms, as long as the proportion of the rutile form does not exceed at most 50% by weight, preferably at most 40% by weight, particularly preferably at most 30% by weight, very particularly preferably being from 0.01 to 30% by weight. It has namely been shown that an excessive proportion of rutile reduces the lifetime of the plastics material. In a preferred embodiment, the proportion of the anatase form is at least 50% by weight, preferably at least 60% by weight, particularly preferably at least 70% by weight, very particularly preferably from 70 to 100% by weight. If the proportion of anatase is smaller than 50% by weight, the reactivity of the particles is then generally insufficient.

The forms of titanium dioxide mentioned can be analyzed and detected by methods known per se. Among these are inter alia X-ray diffraction studies, e.g. as in "Quantitative X-ray diffraction analysis of rutile-anatase mixtures", Andratschke, M.; Dassler, A.; Feltz, A. Sekt. Chem., Friedrich-Schiller-Univ., Jena, Ger. Dem. Rep. Hermsdorfer Technische Mitteilungen (1990), 30(78), 2503-7. CODEN: HTMTAN ISSN: 0439-0377.

A product which has the desired properties and which can be produced in an extremely simple process can be obtained only by virtue of the balance of rutile/anatase proportion, the particle size of the titanium dioxide particles, and the ratio of the amounts of titanium dioxide particles and of matrix particles within the layer b3).

The titanium dioxide particles described can be produced by processes known per se, or are obtainable commercially.

Valuable information for the production of useful titanium dioxide particles with the appropriate particle size, and also of the required proportion of anatase, is found in the literature, for example in patents of the companies Toto and Showa-Denko, or in the publications of the *Japanese Association of Photocatalytic Products* (*JAPP*).

Among titanium dioxide particles that can be used with particular success are, in a non-exhaustive list, inter alia products from the following companies: Showa Denko, Nadico, Evonik-Degussa, and others.

Particularly preferred embodiments of the invention are characterized in that b1+2) and, respectively, b2) and b32) are silicon dioxide with the same properties. This means that the water-spreading layer b1+2) or b2), and also the matrix substance for the photocatalytically active layer b3), are based on a silicon dioxide from the same source with the same properties.

A significant advantage of the invention derives inter alia from conservation of resources. This is apparent inter alia in very low materials consumption. A preferred plastics material as in the first preferred embodiment of the invention therefore features a thickness in the range from 0.01 to 2 μm for the adhesion-promoter layer b1); a thickness in the range from 0.01 to 2 μm for the water-spreading layer b2); and a thickness in the range from 0.01 to 1 μm for the photocatalytically active layer b3); where the total thickness of the layers b2) and b3) is not greater than 2 μm.

The total thickness of all three layers b1)+b2)+b3) is still more preferably also no greater than 2 μm.

Other advantageous plastics materials are those in which the ratio of the thicknesses b3):b2) is in the range from 0.05 to 0.5.

A feature of a preferred plastics material as in the second preferred embodiment of the invention is that the thickness of the sol-adhesion-promoter layer b1+2) is in the range from 1 to 50 μm, preferably from 2 to 30 μm, particularly preferably from 3 to 20 μm; and the thickness of the photocatalytically active layer b3) is in the range from 0.01 to 1.0 μm, preferably from 0.02 to 0.5 μm, and particularly preferably from 0.03 to 0.3 μm; where the total thickness of the layers b1+2) and b3) is not greater than 51 μm, preferably not greater than 50 μm, and particularly preferably not greater than 40 μm.

The abovementioned layer thicknesses are important insofar as sufficient adhesion to the substrate and sufficiently long life are achieved. A sufficient thickness of the first layer ensures protection of the substrate from photocatalytic attack by the second layer. The transparency and clarity of the entire layer are ensured by keeping the maximum thickness of the second layer below a prescribed level. The hydrophilic properties and photocatalytic activity are ensured by exceeding the stated minimum thickness of the photocatalytic layer.

In a further preferred modification, a feature of the plastics material in the invention is that it has, above the photocatalytically active layer b3), a further water-soluble coating b4), and a protective film b5) peelably adhering thereto. For transport from the factory to the location of use, the surfaces of rigid plastics structures are mostly protected by a weakly adhering, easily peelable film b5). The protective film b5) can be composed of paper or of plastic; polyolefin films are preferred. It has been found that protective films usually used for this purpose, where these have a pressure-sensitive adhesive layer, adhere more strongly than desired to the coated plastics surface. In order to facilitate the peeling of the protective film at the location of use, a further thin layer b4) made of a water-soluble material can be applied to the photocatalytically active layer b3). Examples of suitable material are dextrins, cellulose ethers, sodium polyacrylate and sodium polymethacrylate, polyvinyl alcohol, and gelatins. The protective film b5) can easily be peeled from these intermediate layers. The water-soluble intermediate layer b4) does not have to be removed, since this itself has water-spreading action. It is lost over the course of time with condensate water that runs off the material, and it then leaves the photocatalytically active coating behind, which has long-lasting water-spreading properties.

Particular preference is therefore given for the purposes of the invention to plastics materials characterized in that, above the photocatalytically active layer b3), they have a further water-soluble coating b4) and a protective film b5) peelably adhering thereto.

The plastics materials of the invention feature inter alia good effectiveness against initial algal growth. In a preferred embodiment they are in particular characterized by inhibition of initial algal growth in the range from 75 to 90%, measured in the standardized test for algal growth after UV irradiation and weathering.

The invention also provides a process for the in-line production of a sheet-like plastics material with reduced tendency toward algal colonization on at least one surface, comprising the extrusion and in-line coating of a thermoplastic substrate, where, in succession, A) a thermoplastic substrate is extruded as base;
and then either
B) onto one surface of the extruded base, the temperature of which is from 40° to 70° C., a solution of an organic polymer material which is not soluble in water and which is in essence not swellable in water, and which is soluble in organic solvents and which comprises polar groups is applied, and is dried;
C) onto the dry layer B), the temperature of which is from 40° to 70° C., an aqueous solution of an inorganic colloid sol is applied, and is dried until residual moisture content is less than one percent by weight of water;
or, in place of steps B) and C), in step
B1+2), onto one surface of the extruded base, the temperature of which is from 40° to 70° C., a mixture of an adhesion promoter and of an inorganic colloid sol is applied, and is dried and/or hardened,
where the process is characterized in that
D) onto the layer from step C) or B1+2), the temperature of each of which is from 40° to 70° C., and each of which optionally comprises residual moisture, especially in the case of adhesion promoters which cure through drying, an aqueous solution of a mixture comprising, based on the solids content of the mixture in percent by weight, from 1 to 25% of titanium dioxide and from 75 to 99% of silicon dioxide and/or of a metal oxide which is not soluble in water, or of an anionically modified silicon dioxide or metal oxide, is applied, and is dried;

where the titanium dioxide is in particle form and its average primary-particle size is smaller than 10 nm, and the proportion of the rutile form therein is preferably at most 50% by weight.

The coating process of the invention involves an in-line process. This means coating in a line immediately following the production of the sheet-like plastics substrate, preferably through extrusion. The individual layers of the coating are applied consecutively and are respectively cured and dried sufficiently quickly to prevent application of the next layer from impairing the success of the coating process.

The adhesion-promoting layer b1) can be applied from an aqueous dispersion or from an organic solution of the means of coating. Because the thickness of the layer is extremely low, it is possible to apply the dispersion or solution in highly dilute form. Advantageous concentrations are from 0.1% to 40%, preferably from 1 to 10%. The liquid coating composition can be applied by spreading, casting, roll application, spraying, or other known methods. The coating liquid applied can if necessary be uniformly distributed by a doctoring system, e.g. a wire doctor, toothed doctor, rubber doctor, or air knife. Immediately after the application process, the liquid component is evaporated, for example in a hot-air dryer.

The water-spreading layer (oxide layer) b2) is then applied in the same type of way. It is preferable to apply a colloidal aqueous solution or, respectively, dispersion of the oxide. It is also possible to apply a compound of silicon or of the metal, this compound being hydrolyzed on the coated surface. By way of example, a solution of an orthosilicic ester in weakly acidified alcohol can be applied. The ester hydrolyzes during or after the drying of the coating. It is advantageous that the coating liquid forms a coherent layer, and this can be encouraged if necessary through addition of—preferably non-ionic—surfactants. Examples of suitable surfactants are ethoxylated fatty alcohols at a concentration of from 2 to 20% by weight of surfactant, based on oxide content, preferably from 3 to 5% by weight. It is preferable to avoid using more of the surfactant than is just sufficient for uniform wetting. The water is then evaporated, again preferably in a hot-air dryer. The temperature in the coating here mostly does not rise above 50 to 60° C. Abrasion resistance and adhesion are further noticeably improved if the dried coating is heated for a further period to a higher temperature, for example to above 80° C. for at least 3 minutes, preferably from 5 to 10 minutes. Temperatures used depend on the nature of the plastic and can be up to above 100° C., sometimes up to 150° C.

In the second preferred embodiment of the present invention, in the same way as the water-spreading layer (oxide layer) b2) is applied to the layer b1) in the 1$^{st}$ preferred embodiment, an adhesion-promoting water-spreading sol-adhesion-promoter layer b1+2) is applied here, but in this case is applied to the substrate.

It is advantageous that the coating liquid here forms a coherent layer, and this can if necessary be encouraged by addition of—preferably nonionic—surfactants. Examples of suitable surfactants are ethoxylated fatty alcohols at a concentration of from 2 to 20% by weight of surfactant, based on oxide content, preferably from 3 to 5% by weight. It is preferable to avoid using more of the surfactant than is just sufficient for uniform wetting. The water is then evaporated, again preferably in a hot-air dryer. The temperature in the coating here mostly does not rise above 50 to 60° C. Abrasion resistance and adhesion are further noticeably improved if the dried coating is heated for a further period to a higher temperature, for example to above 80° C. for at least 3 minutes, preferably from 5 to 10 minutes. Temperatures used depend on the nature of the plastic and can be up to above 100° C., sometimes up to 150° C. If a layer is sufficiently thin and a section is sufficiently long, the residual heat of the sheet is preferably also sufficient for the drying process and evaporation of the volatile components. In the case of radiation-curable polymer dispersions, there can also be, following the drying step, a curing step through irradiation with light of suitable wavelength, e.g. UV light.

This is followed by application of the photocatalytically active layer b3) in the same way as the layer b1+2) or b2).

In a modification of the second preferred embodiment of the invention, the abovementioned curing step can take place through irradiation with light of suitable wavelength, e.g. UV light, only after the application and drying of the photocatalytically active layer b3). This variant permits spatial separation of coating unit and curing unit, and this has an advantageous effect on the space-saving utilization of the available space within the line, and can have a favorable effect on the properties of the coating, e.g. adhesion.

The selection of the constituents of the solutions for the individual coating steps, and also of the concentration of the individual coating solutions, depends inter alia on the economics of the process. It is thus possible to coat the plastics substrates in-line within the parameter range described. The temperature of the freshly extruded plastics substrate which retains some heat here is preferably sufficient over the entire duration of the process to cure and dry the individual layers without further introduction of energy. The selected concentrations for the individual coating solutions are moreover advantageously such that the resultant thickness of the respective layer, and also the resultant total thickness, is within the ideal range.

In an advantageous modification of the process of the invention, the adhesion-promoter layer b1) in step B) or b1+2) in step B1+2) is applied and dried or cured within from 30 to 120 seconds.

Another embodiment of particular interest is one in which steps C) and, respectively, B1+2) and D) are carried out within a total of from 30 to 180 seconds.

This gives a preferred process time in the range from 1 minute to 5 minutes for the complete coating, and the process of the invention is therefore particularly suitable for in-line conduct.

Finally, it can be advantageous for the transport of the coated plastics materials if, following step D), in a further step E), a water-soluble coating, and also a peelable protective film adhering thereto, is applied.

By virtue of the excellent property profile and in particular by virtue of the combination of the properties of "water-spreading" and "photocatalytic activity", the coated plastics materials of the invention are suitable for a wide variety of applications. However, the plastics material is of particular interest when used as roofing material and/or glazing material. The material can be used throughout these sectors. However, its particular strength is preferably of significance in the use in spaces subject to moist conditions, examples being swimming pools and saunas, and in the outdoor sector, porches, greenhouses, and carports, general roofing, and the like.

A particularly advantageous use is that with reduced initial tendency toward algal colonization and/or reduced initial bacterial growth.

Inventive examples and comparative examples are used below to describe the invention in more detail.

1. Description of Method

Determination of Resistance of Coating Materials to Algal Infestation

1) Principle

The resistance of coatings to algal growth is determined by a method based on that of the "IBRG (International Biodeterioration Research Group)—Paints Working Group, Algicidal Paints Project: A method for evaluating algicidal compounds in exterior coatings; IBRG/P98/03". This method uses aeroterrestrial microalgae which in practice occur on facade coatings. Another feature of the method is that, for moisture level retention, the test specimens are not coated with a liquid medium comprising algae but instead the specimens are kept in an incubator containing wet vermiculite. No diffusion therefore occurs between specimen surface and liquid medium. The experiment therefore provides maximum accuracy of simulation of the practical situation.

2) Types of Algae and Culturing

The following aeroterrestrial microalgae are used: *Stichococcus bacillaris* (SAG 379-1a) and *Scenedesmus vacuolatus* (SAG 211-8b). The microalgae are cultured at room temperature, with irradiation by light, in Kuhl algal nutrient solution. A cycle is used here, composed of respectively 16 h of irradiation with light and 8 h of storage under dark conditions. Daylight fluorescent tubes (L36W/965 BIOLUX FLH1) are used here.

|  | Kuhl algal nutrient solution | Concentration |
|---|---|---|
| I. | KNO3 | 1.011 [g/l] |
| II. | NaH2PO4•1H2O | 0.621 [g/l] |
| III. | Na2HPO4•2H2O | 0.089 [g/l] |
| IV. | MgSO4•7H2O | 0.247 [g/l] |
| V. | CaCl2•2H2O | 0.015 [g/l] |
| VI. | H3BO3 | 0.0062 [mg/l] |
| Trace elements: | MnSO4•1H2O | 0.1690 [mg/l] |
|  | ZnSO4•7H2O | 0.2880 [mg/l] |
|  | CuSO4•5H2O | 0.0025 [mg/l] |
|  | (NH4)6Mo7O24•4H2O | 0.0125 [mg/l] |
| VII. | FeSO4•7H2O | 6.950 [mg/l] |

3) Test Specimens

The test specimens (50×50×4 mm) have single-side coating, and the uncoated sides have a marking. The test comprises 4 determinations.

4) Conditioning of Test Specimens

The test specimens are first rinsed with deionized water. The test specimens are then irradiated overnight with UV light (Philips Leuchtstofflampe TL-D 18W/08/BLB) at room temperature.

5) Incubator

The transparent, UV-permeable PLEXIGLAS® incubator (350×250×200 mm) is first disinfected with 70% ethanol and is then ⅓ filled with watered and autoclaved vermiculite. The test specimens are intended to lie on a frame at an angle of 5° (with reference to minimum roof inclination), rather than directly on watered vermiculite. The humidity in the incubator is about 90%.

6) Inoculation and Incubation

For this, sterile pincers are used to place the test specimens onto a frame at an angle of 5°. Care has to be taken that the coated specimen surfaces are upward. Prior to inoculation, the test specimens are sprayed with Kuhl algal nutrient solution (700 μl/test specimen). The inoculation of a specimen with 700 μl of algal mixture suspension with a cell concentration of $10^6$/ml is achieved by using a chromatography test tube atomizer. The algal cell concentration in the algal suspension obtained here is determined by using an improved Neubauer counting chamber. 4 specimens of each coating variant are studied in parallel. The incubation takes place with cycles of 16 hours of light (daylight, about 1000 lux, UV-A, 8 W/m²) and 8 hours of darkness, at room temperature. The humidity in the incubator is about 90%. Algal growth is monitored 7 and 14 days after inoculation. After 14 days, the test specimens are resprayed and inoculated, and incubated for a further 14 days under the same conditions.

7) Evaluation

Algal growth is evaluated by quantitative image analysis, after the test specimens on which growth has taken place have been scanned in transmitted light with a flatbed scanner (Epson Perfection V750 Pro). The degree of growth is the total image area on which algal growth has occurred, divided by the total image area.

2. Inventive Examples and Comparative Examples

2.1 Production of the Coating

2.1.1 Production of the Water-Spreading Coating

A) Production of a coating with an adhesion-promoting layer b1) and a water-spreading SiO₂ layer b2).

A copolymer of 87.6% of methyl methacrylate and 12.4% of gamma-methacryloyloxy-propyltrimethoxysilane was dissolved in butyl acetate, solids content here being 0.7% by weight, and applied in a thin layer with glove-liner material to PMMA sheets, the temperature of which was 50° C. Immediately after drying, the coated sheet can be coated with the next layer.

25 parts by weight of an anionic silica sol (solids content 30%; Levasil obtainable from H. C. Starck), with 0.4 part by weight of an ethoxylated fatty acid alcohol (Genapol X80) were made up to 100 parts by weight with deionized water and coated in a thin layer with glove-liner material onto the sheet which had the adhesion-promoting layer and the temperature of which was 50° C. After air-drying and drying, the sheet with adhesion-promoting layer and SiO₂ layer is immediately coated with the photocatalytic layer.

B) Production of a coating with an adhesion-promoting water-spreading sol-adhesion-promoter layer b1+2)

A coating composition (coating material) composed of

| | |
|---|---|
| Ucecoat 7849 (polyurethane dispersion from Cytec): | 49% by weight |
| Ludox AM (silica sol, aqueous colloidal suspension of SiO₂): | 49% by weight |
| Irgacure 819 DW: | 2% by weight | is applied in a thin layer with glove-liner material at a thickness of 15 μm to a PMMA sheet, the temperature of which is 60° C. After application, the layer of coating material is first heat-dried, at drying temperatures in the range from 40° to 80° C. This forms a polymer network. UV curing then takes place in a second step. The final properties of the coating b1+2) are achieved only after the second curing process.

2.1.2 Production of the Photocatalytic Layer

2.1.2.1 With Anatase Form of Titanium Dioxide

A)

50 parts by weight of a 0.8 percent aqueous dispersion of titanium dioxide (anatase) with average particle size<8 nm and specific surface area 160+/−30 qm/g, produced by a hydrosynthetic process and 12.5 parts by weight of an anionic silica sol (solids content 30%; Levasil obtainable from H. C. Starck), with 0.4 part by weight of an ethoxylated fatty acid alcohol (Genapol X80) were made up to 100 parts by weight with deionized water and coated in a thin layer with glove-liner material onto the sheet which had the $SiO_2$ layer and the temperature of which was 50° C., as in 2.1.1 A). After air-drying and drying, the sheet with adhesion-promoting layer and water-spreading layer can immediately be coated with the water-soluble protective layer.

B)

The procedure is as in A), but only 25 parts of the 0.8 percent aqueous dispersion of titanium dioxide are used and are made up to 100 parts with water.

The results of performance tests on the sheets thus coated are listed at a later stage below.

2.1.2.2 With Rutile/Anatase Form of Titanium Dioxide

A)

50 parts by weight of a 0.8 percent aqueous dispersion of a) 75 parts of titanium dioxide (anatase) with average particle size<8 nm and specific surface area 160+/−30 m²/g, produced by a hydrosynthetic process and b) 25 parts of titanium dioxide (rutile) with average particle size<10 nm produced by a solution-based process of Q.-H. Zhang, L. Gao and J.-K Guo, NanoStructured Materials, Vol. 11, No. 8, pp. 1293-1300, 1999, PREPARATION AND CHARACTERIZATION OF NANOSIZED TiO2 POWDERS FROM AQUEOUS TiC14 SOLUTION and 12.5 parts by weight of an anionic silica sol (solids content 30%; Levasil obtainable from H. C. Starck), with 0.4 part by weight of an ethoxylated fatty acid alcohol (Genapol X80) are made up to 100 parts by weight with deionized water and coated in a thin layer with glove-material onto the sheet of 2.1.1 A) which has the $SiO_2$ layer and the temperature of which is 50° C. After air-drying and drying, the sheet with adhesion-promoting layer and water-spreading layer can immediately be coated with the water-soluble protective layer.

B)

The procedure is as in A), but only 25 parts of the 0.8 percent aqueous dispersion of titanium dioxide are used and are made up to 100 parts with water.

After the sheets as in 2.1.2.2 A and B had been coated with the water-soluble protective layer as in 2.1.3 below, they exhibited good photocatalytic activities, i.e. markedly reduced algal growth. After artificial weathering in a Xenotest for 700 h, only very slight clouding of the sheet, i.e. slight damage through photocatalytic decomposition, was observed.

2.1.3 Production of the Water-Soluble Protective Layer (Optional)

A solution of a water-soluble polymer can be applied in a thin layer as fourth layer in order to reduce the adhesion of a lamination film on the coating. Suitable polymers are: dextrins, cellulose ethers, sodium poly(meth)acrylates, polyvinyl alcohol, gelatin, or partially acetylated starch. After application of the water-soluble polymer, the coated sheet can be laminated to a commercially available protective film.

2.2 Comparative Examples 2.2.1 Comparative Example Without Photocatalytic Layer

The procedure is as described in 2.1, but the third coating (photocatalytic coating) is omitted.

2.2.2 Comparative Example With Large Titanium Dioxide Particles in the Photocatalytic Layer

A)

The procedure is as in 2.1, but, instead of the aqueous dispersion of titanium dioxide described in 2.1.2, a composition made of 2.67 parts of a 30 percent titanium dioxide dispersion is used, with average primary-particle size 14 nm and 47.33 parts of deionized water.

B)

The procedure is as in 2.2.2 A), but only 1.33 parts of the titanium dioxide dispersion are used and made up to 100 parts with water.

2.2.3 Comparative Example With Large Titanium Dioxide Particles in the Photocatalytic Layer

A)

The procedure is as in 2.2.2 A, but, instead of the titanium dioxide dispersion mentioned, a different titanium dioxide dispersion is used, with average primary-particle size 21 nm.

B)

The procedure is as in 2.2.3 A), but only 1.33 parts of the titanium dioxide dispersion are used and made up to 100 parts with water.

2.2.4 Comparative Example With a Combination of Large and Small Titanium Dioxide Particles in the Photocatalytic Layer

A)

The procedure is as described in 2.2.2 A, but a combination is used, made of a titanium dioxide dispersion with aggregate size<100 nm (VP disp. W 2730 X, anatase:rutile=85:15; produced by Evonik-Degussa GmbH) with titanium dioxide (rutile) with average particle size<10 nm produced by a solvent-based process of Q.-H. Zhang, L. Gao and J.-K Guo, NanoStructured Materials, Vol. 11, No. 8, pp. 1293-1300, 1999, PREPARATION AND CHARACTERIZATION OF NANOSIZED TiO2 POWDERS FROM AQUEOUS TiC14 SOLUTION, where the ratio by weight of the large particles to the small particles is 25:75.

B)

The procedure is as in 2.2.4 A), but only 1.33 parts of the titanium dioxide dispersion are used and made up to 100 parts with water.

Comparative examples 2.2.4 A and B exhibited severe clouding (haze>20) in the performance test after artificial weathering in a Xenotest for 700 h, indicating severe degradation by photocatalytic decomposition.

In order to measure the effect due solely to the photocatalytic layer, the water-soluble layer of 2.1.3 was washed off and the test for growth-inhibiting action was carried out by the method described for "Determination of resistance of coating materials to algal infestation". The weathering test was carried out in accordance with DIN EN ISO 4892 in a Xenotest with wet-dry cycles.

Color Fading Test

Degradation of dye (methylene blue) on (in) porous surfaces was tested to provide an estimate of photocatalytic activity. For this, a glass ring with seal was placed on the surface and wetted with 5 ml of the methylene blue solution (6 mg/L). The dye penetrates into the porous surface. The excess is removed, and the remaining stain is irradiated with UV/A light. The results for decolorization of the dye are determined visually, "0" here corresponding to no discoloration and "4" here corresponding to complete discoloration.

The test results were as follows:

TABLE

Results

| No. | Description | Algal growth without UV irradiation | Algal growth with UV irradiation | Algal growth with UV irradiation after weathering | Comment | Angle of contact prior to UV irradiation | Angle of contact after UV irradiation | Clouding prior to weathering | Clouding after 700 h of weathering | Clouding after 2500 h of weathering | Color-fading test (48 h) |
|---|---|---|---|---|---|---|---|---|---|---|---|
| 2.1.3.1A | Inventive example | n.a. | n.a. | n.a. | Clear, transparent | n.a. | n.a. | n.a. | n.a. | n.a. | 4 |
| 2.1.3 1B | Inventive example | 48% | 24% | 18% | Clear, transparent | 8° | 10° | Haze 4% | Haze: 4% | Haze 6% | 2 |
| 2.2 1 | Comparative example without $TiO_2$ layer | 48% | 35% | 61% | Clear, transparent | 8° | 15° | Haze 3.5% | n.a. | Haze 1.8% | 1 |
| 2.2.2 B | Comparative example, large $TiO_2$ particles | n.a. | n.a. | n.a. | Cloudy | 9-11° | 6-10° | Haze 10% | cloudy; haze 28% | n.a. | |
| Saint-Gobain Bioclean | Photocatalytic silicate glass | 52% | 15% | 17% | Somewhat cloudy | 52° | 8° (after 80 h) 57° (after 20 h) | n.a. | n.a. | n.a. | |

The photocatalytic action is measurable on all specimens with titanium dioxide, but in the comparative examples the coating develops cracks and becomes cloudy. In the comparative example without photocatalyst, algal growth is not effectively inhibited.

Effectiveness in Countering Bacterial Growth:

Effectiveness in countering bacteria was determined in accordance with ISO 27447, Fine ceramics (advanced ceramics, advanced technical ceramics)—Test method for antibacterial activity of semiconducting photocatalytic materials (First Edition 2009-06-01).

In open-air weathering, algal growth is often preceded by primary colonization by bacteria which serve as substrate promoting algal growth. The design of the photocatalytic layer is therefore such that it can also inhibit growth of bacteria. The bacteria used in experiments were *Pseudomonas aeruginosa*, strain No.: ATCC 15442.

Evidence is provided here by the following examples:

| No. | Description | Bacterial growth (BG) without UV radiation | Bacterial growth (BG) with UV radiation |
|---|---|---|---|
| 2.1.2 B | Inventive example | $10^6$ | $10^0$ |
| 2.2 1 | Comparative example | $10^6$ | $10^4$ |
| Saint-Gobain Bioclean | Photocatalytic silicate glass | $10^6$ | $10^0$ |

What is claimed is:

1. A coated sheet-like plastics material, comprising
a) as a base, a thermoplastic substrate; and
b) on the base, a photocatalytically active coating comprising
   a water-spreading layer b(2) comprising
      a colloid-sol layer b(22) arranged on an adhesion-promoter layer b(1) applied on the substrate a), and
   a photocatalytically active layer b(3) arranged on the water-spreading layer,
where the photocatalytically active layer b(3) is obtained by a process comprising drying a mixture comprising, based on solids content of the mixture, in percent by weight,
b(31) from 1 to 25% of titanium dioxide and
b(32) from 75 to 99% of at least one of silicon dioxide and a metal oxide, which is not soluble in water or of an anionically modified silicon dioxide or metal oxide;
where the titanium dioxide is particulate and has an average primary-particle size smaller than 10 nm.

2. The plastics material according to claim 1, wherein:
the adhesion-promoter layer b(1) is obtained by a process comprising drying an organic polymer material which is not soluble in water, is in essence not swellable in water, is soluble in organic solvents and comprises polar groups; and
the water-spreading layer b(2) is obtained by a process comprising drying an inorganic colloid sol.

3. The plastics material according to claim 1, wherein a rutile form has at most 50% by weight of the titanium dioxide.

4. The plastics material according to claim 1, wherein the layers b(2) and b(3) comprise silicon dioxide with the same properties.

5. The plastics material according to claim 1, wherein:
a thickness of the adhesion-promoter layer b(1) is in the range from 0.01 to 2 μm;
a thickness of the water-spreading layer b(2) is in the range from 0.01 to 2 μm; a thickness of the photocatalytically active layer b(3) is in the range from 0.01 to 1 μm; and
a total thickness of the layers b(2) and b(3) is not greater than 2 μm.

6. The plastics material according to claim 1, wherein a ratio of b(3) over b(2) in thickness is in a range from 0.05 to 0.5.

7. The plastics material according to claim 1, wherein water-soluble coating b(4) and a protective film b(5) peelably adhere to the photocatalytically active layer b(3).

8. A material for roof or glazing, comprising the plastics material according to claim 1.

9. The plastics material according to claim 1, wherein the material has reduced initial tendency toward algal colonization, reduced initial bacterial growth or both.

* * * * *